United States Patent
Sakurada

(10) Patent No.: US 7,069,175 B2
(45) Date of Patent: Jun. 27, 2006

(54) METHOD AND APPARATUS FOR SUPPORTING MEASUREMENT OF OBJECT TO BE MEASURED

(75) Inventor: Junji Sakurada, Sapporo (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/653,224

(22) Filed: Sep. 3, 2003

(65) Prior Publication Data

US 2004/0054502 A1 Mar. 18, 2004

(30) Foreign Application Priority Data

Sep. 17, 2002 (JP) .............................. 2002-269447

(51) Int. Cl.
*G01B 3/22* (2006.01)
(52) U.S. Cl. ...................... 702/167; 702/168; 702/182; 702/188
(58) Field of Classification Search ................ 702/167; 345/419; 451/8
See application file for complete search history.

(56) References Cited

U.S. PATENT DOCUMENTS 5,297,254 A * 3/1994 Arai et al. ................... 345/443
6,600,808 B1 * 7/2003 Takada et al. ................. 378/62

FOREIGN PATENT DOCUMENTS

| JP | A 63-206607 | 8/1988 |
| JP | A 3-288909 | 12/1991 |
| JP | A 8-29152 | 2/1996 |
| JP | A 8-339215 | 12/1996 |
| JP | A 9-91019 | 4/1997 |
| JP | A 2000-161942 | 6/2000 |

* cited by examiner

*Primary Examiner*—John Barlow
*Assistant Examiner*—Stephen J. Cherry
(74) *Attorney, Agent, or Firm*—Oliff & Berridge, PLC

(57) ABSTRACT

A measurement support apparatus comprises a shape definition data input section, a contour shape generator, a measurement part program input section, an analyzer, a synthesizer, and a display unit. The shape definition data input section is used for entering shape definition data for an object to be measured. The contour shape generates a contour shape based on the shape definition data. The measurement part program input section is used for entering a measurement part program. The analyzer analyzes the measurement part program and outputs the analysis results. The synthesizer synthesizes the analysis results with the contour shape. The display unit displays the synthesis image.

15 Claims, 6 Drawing Sheets

METHOD AND APPARATUS FOR SUPPORTING MEASUREMENT OF OBJECT TO BE MEASURED

BACKGROUND OF THE INVENTION

1. Field of the Invention

The present invention relates to a method and an apparatus for supporting the measurement of an object to be measured using a measurement part program. The present invention relates in particular to a measurement support method and apparatus wherein based on simplified shape definition data of a workpiece, an inspection of a measurement part program can be easily performed.

2. Description of the Related Art

In related art, a machine is controlled by using a numerical value controller and a part program to process or measure a workpiece. By automating the processing and the measurement, unattended processing and unattended measurement are provided. For such an unattended processing and measurement, however, a controller automatically controls a processing device and a measurement device in accordance with a part program. If the part program is imperfect, not only will normal processing and measurement not be performed, but also, depending on the imperfection, a machine may operate without following the program, or a collision between machines or between a machine and a workpiece may occur, thereby resulting in workpiece or machine damage. Therefore, before the processing and the measurement are actually performed, an inspection of the part program is inevitably required.

As the most generally employed inspection method, each instruction in a part program is confirmed by actually executing it for a machine. However, when this method is used to perform an inspection, considerable time must be expended and the costs involved are high. Further, since a machine must be employed for the inspection, the machine can not be used to perform processing and measurement and its actual working ratio is reduced.

According to another inspection method for a part program, a virtual inspection is performed by using a CAD system which created the part program. In this case, while the actual working ratio of a machine is not reduced, an expensive CAD system is required. Further, to operate the CAD system and obtain acceptable results, considerable skill is required, and mastering the operation of the CAD system is not an easy task for a user unfamiliar with computer manipulation operations.

Furthermore, as an example, a part program that has been inspected and satisfactorily executed may be partially altered and employed for a similar workpiece. In this case, since correction errors may occur, the inspection of the entire part program is also inevitable, regardless of how many program corrections have been made. Even when a part program is altered only partially, programming knowledge will inevitably be required; however, mastering a programming method is not easy.

Specifically, a related-art example for easily creating and changing a processing program is disclosed in JP-A-8-339215, wherein the trajectory of a tool and the shape to be processed are displayed based on processing program data, and a processing simulation is performed to create and change a part program. According to this example, shape drawing screen data are generated using the part program employed for the processing.

Another example is disclosed in JP-A-9-91019, wherein a commonly used file is prepared based on a contour data file, and a drawing and a processing program are generated.

Since in the commonly used processing a predetermined shape is obtained by cutting a workpiece, the final workpiece shape can be obtained by analyzing the trajectory of a tool (see JP-A-8-339215). Whereas, if the final workpiece shape can be defined, the acquisition of the processing trajectory or the creation of the drawing is possible (see JP-A-9-91019).

On the other hand, to prepare a measurement program, design data are converted to generate shape data that correspond to the shape of an object to be measured, and the shape data are employed to prepare a measurement procedure program while taking the measurement conditions into account (see JP-A-63-206607).

Further, the direction in which a probe advances and the advanced position and the approach position of the probe are calculated based on CAD data, and travel trajectory data are obtained to prepare an automatic contour measurement part program and a test program (see JP-A-3-288909).

In addition, a probe route program is created based on a CAD drawing, and the measurement results are written to the CAD drawing (see JP-A-8-29152).

Moreover, to generate a travel path based on CAD data and measurement data, an offset shape where a shape of an object to be measured is offset externally is created, and a travel path is generated along the offset shape (see JP-A-2000-161942) However, in this case, since the travel path is generated on a plane at a predetermined distance from a projection point of an object to be measured in order to prevent a probe and the object to be measured from interfering with each other, a longer than necessary travel distance is required, and an enormous amount of time is wasted during the measurement period.

As is described above, various devises are proposed for the creation of the measurement program.

For fear that there maybe an outflow of technical know-how, manufacturing security control has been tightened. For a workpiece for which performance can be estimated by analyzing the CAD data for the workpiece, the CAD data are kept secret and are not provided.

However, the above-mentioned related-art method generates a measurement part program based on CAD data. For example, only a measurement part program and data for a simple workpiece shape are provided. Therefore, when a CAD system or CAD data are not available, a problem still exists in that an inspection of a measurement part program is not easy as described above.

As previously described, for a processing part program, since a final workpiece shape can be obtained by analyzing the processing trajectory, an inspection of a part program is comparatively easily performed. However, a travel trajectory obtained using a measurement part program does not always match the shape of a workpiece. Further, it is very difficult to inspect which point of a workpiece is measured by a measurement part program, or to inspect whether or not a travel trajectory interferes with the workpiece.

Furthermore, a measurement part program created by a common CAD system generates a travel path on the plane at a predetermined distance from the projection point of an object to be measured in order to prevent interference between a probe and the object to be measured. Therefore, a longer distance than necessary is required, and an enormous amount of time is wasted during the measurement period. To resolve this problem, the travel path of the probe is reduced and optimized to improve the measurement efficiency. However, in this case, it is difficult to inspect a measurement part program that has been corrected.

SUMMARY OF THE INVENTION

To resolve these problems, an object of the present invention is to provide a measurement support method and apparatus for easily inspecting a measurement part program based on simplified shape definition data of a workpiece.

To achieve this object, according to the present invention, a method for supporting a measurement of an object to be measured, comprises:

entering shape definition data for an object to be measured;

generating a contour shape based on the shape definition data;

displaying the contour shape;

entering a measurement part program; and analyzing the measurement part program to obtain a portion to be measured, wherein at the display step, the portion to be measured is displayed while superimposed on the contour shape.

According to this invention, the contour shape of the object to be measured is generated based on the simplified shape definition data of the object to be measured, the measurement part program is analyzed to obtain a portion to be measured, and the contour shape and this portion are superimposed and displayed. Thus, the portion of the object to be measured can be easily identified. For the measurement part program, the origin of the coordinates and the coordinate axis of the object to be measured (the workpiece) can be freely changed; however, this makes it difficult to perform an analysis that uses visual confirmation of a measurement part program. According to the invention, since the portion to be measured can be clearly displayed relative to the contour shape of the object to be measured, even a less than skillful operator can easily determine whether a measurement part program is appropriate.

Further, it is preferable that the measurement support method of the invention further comprise:

analyzing the measurement part program to obtain a travel path, wherein at the display step, the travel path is displayed while superimposed on the contour shape.

According to the invention, the travel path is calculated by analyzing the measurement part program, and is displayed while superimposed on the contour shape. Therefore, the positional relationship between the object to be measured and the travel path can be easily understood, and whether the travel path is wasted and whether interference with the object to be measured occurs can be easily identified. Therefore, the tentative calculation of the measurement efficiency can be performed and collisions can be prevented.

Furthermore, it is preferable that the measurement support method of the invention further comprise:

checking an interference portion between the portion to be measured or the travel path, and the contour shape, wherein at the display step, the interference portion is displayed while superimposed on the contour shape.

According to the invention, since the interference portion between the portion of the object to be measured or the travel path, and the contour shape can be accurately obtained by calculations based on the coordinate value, whether an interference will occur at a portion that can not easily be visually identified can be clearly determined. In addition, since the interference portion and the contour shape are superimposed and displayed, a plan for correcting a measurement part program can be easily established.

Moreover, it is preferable that the measurement support method further comprise:

correcting the measurement part program based on results obtained by correcting the portion to be measured which is displayed.

According to the present invention, the portion to be measured that is displayed while superimposed on the contour shape of the object to be measured can be moved to an appropriate position using a mouse or a cursor key, and can be corrected. Also, since the measurement part program is corrected in accordance with the results obtained by correcting the portion to be measured and the corrected measurement part program is output, the process for correcting the measurement part program can be performed extremely easily and accurately.

Moreover, it is preferable that the measurement support method of the invention further comprise:

correcting the measurement part program based on results obtained by correcting the travel path that is displayed.

According to the invention, the travel path that is displayed while superimposed on the contour shape of the object to be measured can be moved and corrected by using a mouse or a cursor key. Therefore, correction of a long travel path and the prevention of interference between the object to be measured and the probe can be performed extremely easily. In addition, since the measurement part program can be corrected in accordance with results obtained by correcting the portion to be measured and the corrected measurement part program is output, the process for correcting the measurement part program can be performed extremely easily and accurately.

Further, it is preferable that the measurement support method further comprise:

correcting the portion to be measured or the travel path based on the interference portion-to eliminate the interference portion; and correcting the measurement part program based on the elimination of the interference portion.

According to the invention, since the portion to be measured or the travel path are automatically corrected based on the coordinate value of the interference portion, the occurrence of interference can be exactly avoided. Furthermore, since the measurement part program is corrected based on the results obtained by avoiding the occurrence of interference, erroneous manual elimination of the interference can be avoided, and the measurement part program can be precisely corrected.

It is preferable that the measurement support method of the invention further comprise:

converting design data into shape definition data for the object to be measured.

According to the invention, when design data such as CAD data are available, the shape definition data can be automatically generated by extracting the contour shape from the design data. Therefore, the efficiency of the process for inspecting the measurement part program can be improved.

Moreover, it is preferable that the measurement support method of the invention further comprise:

generating at least one of coordinate axes and a coordinate origin by employing the measurement part program or the shape definition data, wherein at the display step, at the least one of the coordinate axes and the coordinate origin that is generated is displayed while superimposed on the contour shape.

According to the invention, based on the measurement part program or the shape definition data, the directions of the coordinate axes, such as the X axis, the Y axis and the R axis, and the position of the coordinate origin of the object to be measured are displayed while superimposed on the contour shape of the object to be measured. Therefore, a clear positional relationship can be obtained between the contour shape of the object to be measured, and the coordinate axes and the origin position of the object to be measured when the shape is defined, or the coordinate axes and the origin position that are defined by the measurement part program. Especially for the measurement part program, a problem has existed in that, when the individual instructions in the measurement part program are executed, the coordinate axes and the coordinate origin are not easily identified because they can be arbitrarily set or changed. However, according to the invention, since the coordinate axes and the coordinate origin are clearly displayed, errors due to intricacy can be avoided.

It is preferable that the measurement support method of the invention further comprise:

generating coordinate scale based on the measurement part program or the shape definition data, wherein at the display step, the coordinate scale that is generated is displayed while superimposed on the contour shape.

According to the invention, the coordinate scale is generated based on the measurement part program or the shape definition data and, on the display, is superimposed on the contour shape of the object to be measured. Therefore, the size of the object to be measured, the coordinate value of the portion to be measured and the individual coordinate values along the travel path can be easily identified.

It is preferable that the measurement support method of the invention further comprise:

displaying the measurement part program with the contour shape; and selecting a measurement instruction included in the measurement part program that is displayed, wherein at the step of calculating the portion to be measured, a portion corresponding to the selected measurement instruction is highlighted and output.

According to the invention, since both the measurement part program and the contour shape of the object to be measured are displayed at the same time on the right and left of the display screen, the correlation existing between the measurement part program and the object to be measured can be clearly identified. Especially, since the measurement instruction in the measurement part program is selected and a corresponding portion to be measured along the contour shape of the object to be measured is highlighted and displayed, the correlation existing between each measurement instruction and each portion to be measured is more clearly identified, and visual confirmation errors do not occur. Therefore, the inspection of the measurement part program or the correction of the portion to be measured can be extremely easily performed.

It is preferable that the measurement support method of the invention further comprise:

displaying the measurement part program and the contour shape at the same time; and selecting a movement instruction included in the measurement part program that is displayed, wherein at the step of calculating the travel path, a travel path corresponding to the selected movement instruction is highlighted and output.

According to the invention, since each movement instruction in the measurement part program is selected, and a corresponding travel path along the contour shape of the object to be measured is highlighted and displayed, the correlation existing between each movement instruction and each travel path location can be more clearly identified, and visual confirmation errors will not occur. Thus, the inspection of the measurement part program or the correction of the travel path can be extremely easily performed.

It is preferable for this invention that the shape definition data for the object to be measured include at least one unit element of a zero-dimensional element, which is a point, a one-dimensional element, which is a line segment, or a two-dimensional element, which includes an arc.

According to the invention, the simple unit elements, such as a zero-dimensional element, which is a point, a one-dimensional element, which is a line segment, and a two-dimensional element, which includes an arc, are employed to describe parameters such as the coordinate value, the direction and the length of the shape definition data of the object to be measured. Therefore, the shape definition data can be easily created or corrected.

It is preferable for the invention that the shape definition data of the object to be measured further include an expansion element for the rotation of the unit element or for the parallel movement of the unit element.

According to the invention, since the shape definition data includes the expansion element for the rotation or the parallel movement of a unit element, such as a point, a line segment or an arc, a point or a line segment need only be defined and rotated 360° to obtain the definition for a circle or a cylinder. Further, when a line segment is defined and is moved in parallel a predetermined distance, the definition of a plane can be obtained. Therefore, by using the unit element and the expansion element together, the contour shape of a complicated object to be measured can be defined, while the shape definition data are not complicated. Thus, the shape definition data can be easily created or corrected.

To achieve the object of the invention, an apparatus for supporting a measurement of an object to be measured comprises:

a shape definition data input section for entering shape definition data for an object to be measured;

a contour shape generator for generating a contour shape based on the shape definition data;

a measurement part program input section for entering a measurement part program;

an analyzer for analyzing the measurement part program and outputting analysis results;

a synthesizer for synthesizing the analysis results with the contour shape; and a display unit for displaying a synthesized image obtained based on the synthesis results.

Since the measurement support apparatus of the invention comprises the shape definition data input section, the contour shape generator, the measurement part program input section, the analyzer, the synthesizer and the display unit, this apparatus can be provided as an individual apparatus for measurement support. The measurement support apparatus can also be integrally formed with a surface property measuring instrument, such as a surface roughness measuring instrument, a true circle measuring instrument or a contour shape measuring instrument, and in this case, the configuration is not complicated. Further, when a computer comprising a central processing unit, a storage unit and an input/output unit that includes a display device executes a program to implement the functions of the shape definition data input section, the contour shape generator, the measurement part program input section, the analyzer, the synthesizer and the display unit, an additional, special apparatus is not required, so that the measurement support apparatus can be provided at a low cost.

Furthermore, it is preferable that the measurement support apparatus of the invention further comprise:

a corrector for correcting the synthesized image that is displayed; and a corrected measurement part program output section for correcting the measurement part program based on the corrected synthesized image and outputting the corrected measurement part program.

According to the invention, a predetermined portion of a synthesized image displayed on the display unit can be moved merely by using a mouse or a cursor key, to optimize the portion to be measured or the travel path. Then, the results are immediately displayed on the screen and the measurement part program is corrected, and as needed, the corrected measurement part program is output. Therefore, the inspection and the correction of the measurement part program can be accurately performed.

Also in this case, when a computer comprising a central processing unit, a storage unit and an input/output unit including a display device executes a program to implement the functions of the corrector and the corrected measurement part program output section, an additional, special apparatus is not required, so that the measurement support apparatus can be provided at a low cost.

As a special effect, the following process can be easily performed. The portion to be measured or the travel path can be corrected, in real time, on the screen of the display unit by using a mouse, a keyboard or a light pen that is provided as a common input means for the computer, and based on the correction results, the measurement part program can be corrected by the corrector. Further, as needed, the corrected measurement part program can be output by the corrected measurement part program output section.

DETAILED DESCRIPTION OF THE INVENTION

Figure 1:
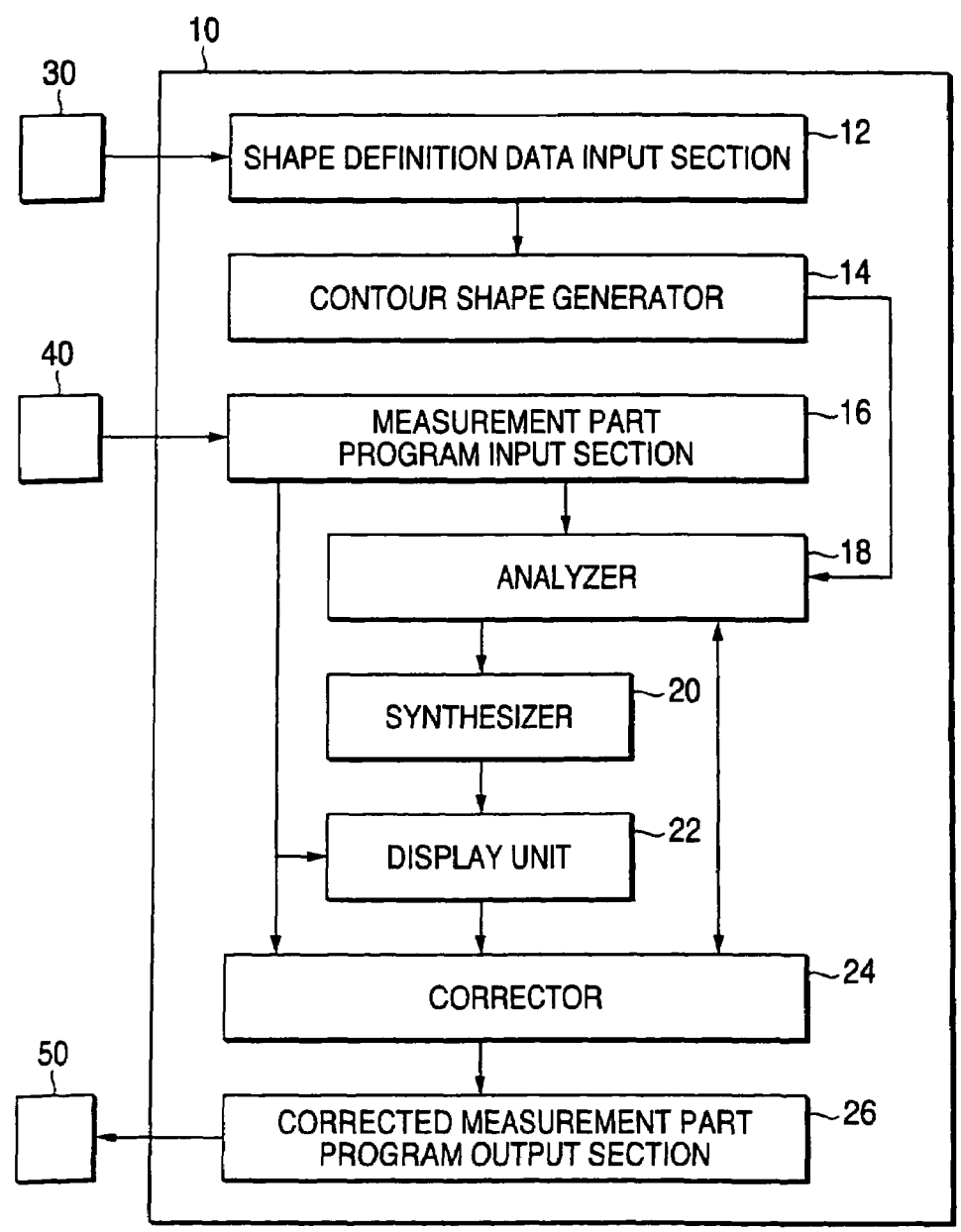
FIG. 1 is a block diagram showing a measurement support apparatus according to the present invention.

The preferred embodiment of the present invention will now be described while referring to the drawings. The same reference numerals are used throughout to denote corresponding components in the drawings.

FIG. 1 is a block diagram showing a measurement support apparatus 10 according to the invention. The measurement support apparatus 10 comprises a shape definition data input section 12, a contour shape generator 14, a measurement part program input section 16, an analyzer 18, a synthesizer 20, a display unit 22, a corrector 24, and a corrected measurement part program output section 26. The shape definition data input section 12 is used for entering shape definition data 30 for an object to be measured and storing the data 30 in a storage device (not shown). The contour shape generator 14 is used for generating a contour shape based on the stored shape definition data 30. The measurement part program input section 16 is used for entering a measurement part program 40 and storing the program 40 in a storage device (not shown) The analyzer 18 is used for analyzing the measurement part program 40 to output analysis results, such as a portion to be measured, a travel path, coordinate axes and the coordinate origin. The synthesizer 20 is used for synthesizing the analysis results with a contour shape. The display unit 22 is used for generating and displaying a synthesized image based on the synthesis results. The corrector 24 is used for correcting the measurement part program 40 based on the results obtained by correcting the synthesized image that is displayed. The corrected measurement part program output section 26 is used for outputting a corrected measurement part program 50 obtained by the correction.

Figure 2:
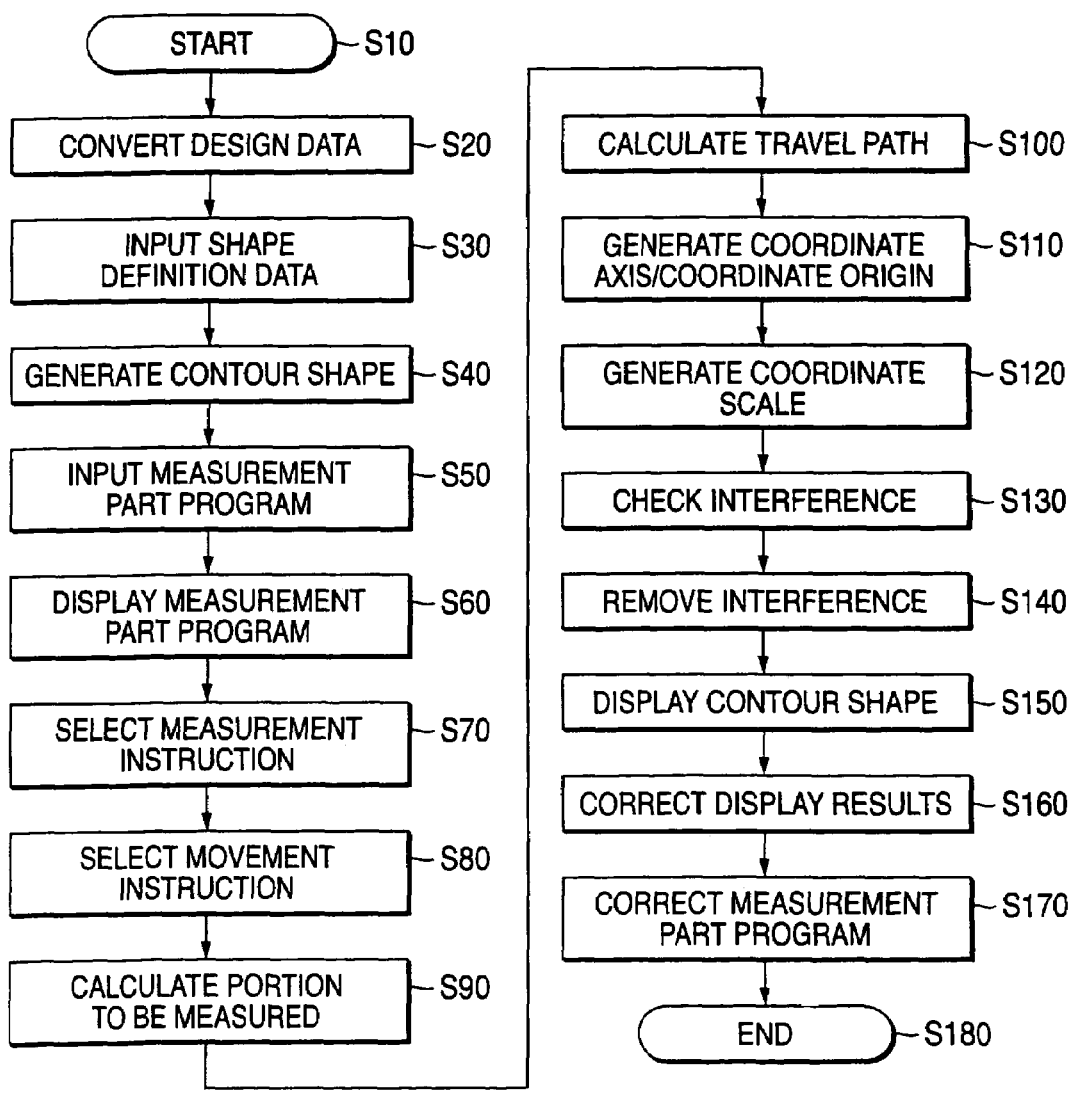
FIG. 2 is a flowchart showing the procedures for a measurement support method according to the invention.

FIG. 2 is a flowchart showing a measurement support method employed by the measurement support apparatus 10 to inspect or correct the measurement part program 30.

First, when design data such as CAD data, used to design a workpiece that is to be measured by the measurement part program 40, are employed, the contour shape data for the workpiece are extracted from the design data, and are converted into the shape definition data 30 (S20). Whereas, when the design data can not be employed and only brief shape data for the workpiece can be employed, the shape definition data 30 are created based on the shape data (S20).

An example for the shape definition data 30 is shown below.

START:OBJECT30
OUTBEGIN:
P1:0,24
P2:57,24
P3:57,34
P4:70,34
P5:70,24
P6:82,24
P7:82,34
P8:95,32
P9:95,24
P10:107,24
ROTATE:Z,360
OUTEND:
INBEGIN:
P1:107,13
P2:87,13
P3:87,8
P4:66,8
P5:62,0
ROTATE:Z,360
INEND:
END:OBJECT30

The first row and the last row indicate the definition start and the definition end for a workpiece name OBJECT30. OUTBEGIN and OUTEND indicate the definition start and the definition end of a workpiece outer contour line, while INBEGIN and INEND indicate the definition start and the definition end of a workpiece internal contour line.

P1 to P10 represent the unit elements for defining the coordinates for points, and ROTATE:Z,360 indicates an expansion element for rotating the points 360° around the Z axis and generating a plane.

Figure 3:
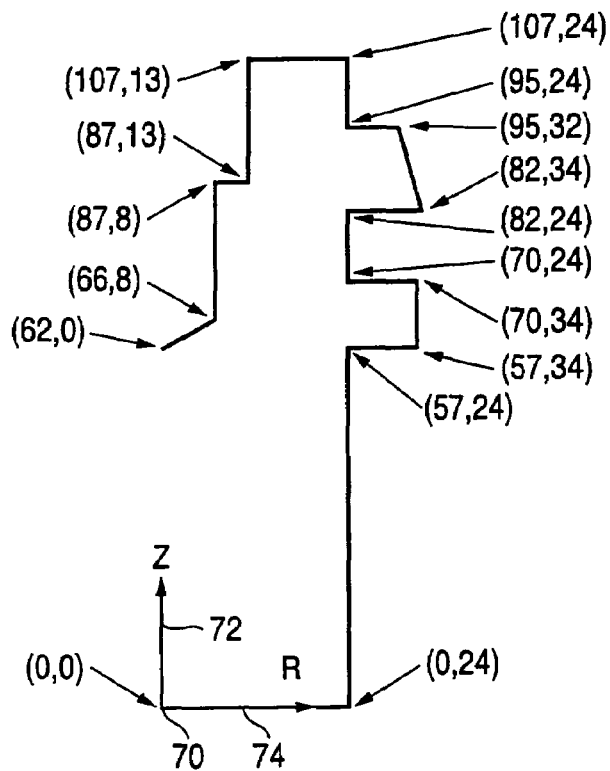
FIG. 3 is a diagram showing an example group of points defined based on shape definition data.

A group of points that are defined by the shape definition data is shown in FIG. 3. When the shape is defined based on the shape definition data 30, an origin 70, a Z axis 72 and an R axis 74 are also indicated, while the coordinate values for the individual points are represented by the form (Z, R) The shape definition data 30 are entered and stored in a storage device (not shown) (S30). The conversion of the design data (S20) and the input of the shape definition data 30 (S30) are performed by the shape definition data input section 12.

Figure 4:
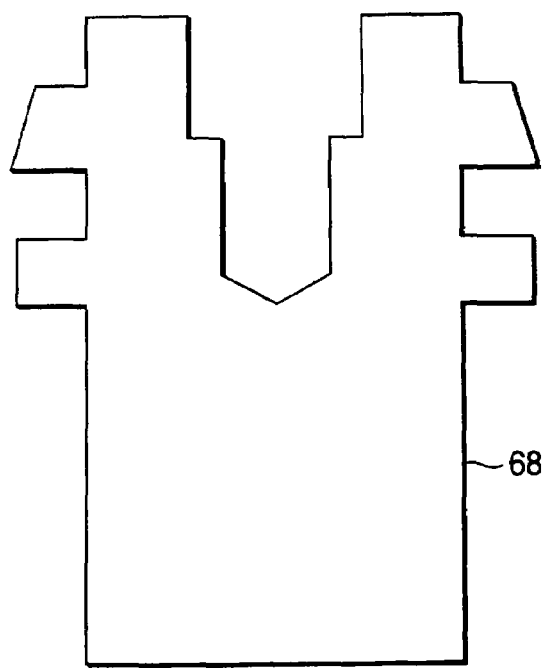
FIG. 4 is a cross-sectional view of a contour shape that is defined based on the shape definition data.

Thereafter, the contour shape of the workpiece is generated by the contour shape generator 14 (S40). When the group of points in FIG. 3 is rotated around the Z axis, the contour shape of the cylindrical workpiece is generated. A cross section 68 of this contour shape is shown in FIG. 4.

Next, the measurement part program 40 is entered and stored in a storage device (not shown) by the measurement part program input section 16 (S50).

Figure 5:
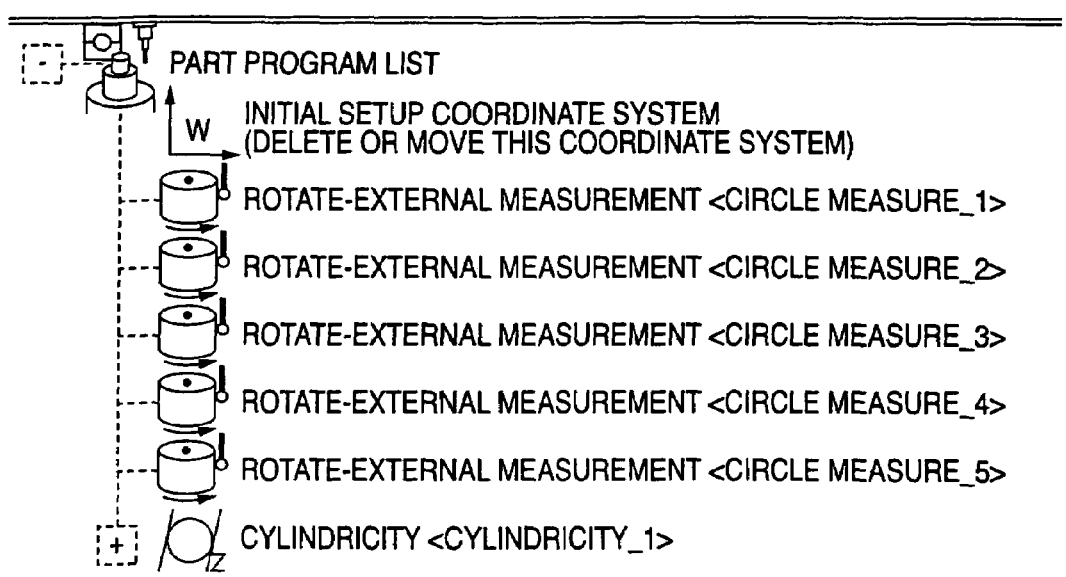
FIG. 5 is a diagram showing an example measurement part program.

An example measurement part program 40 is shown in FIG. 5.

Following this, the measurement part program 40 is displayed by the display unit 22 (S60).

Figure 6:
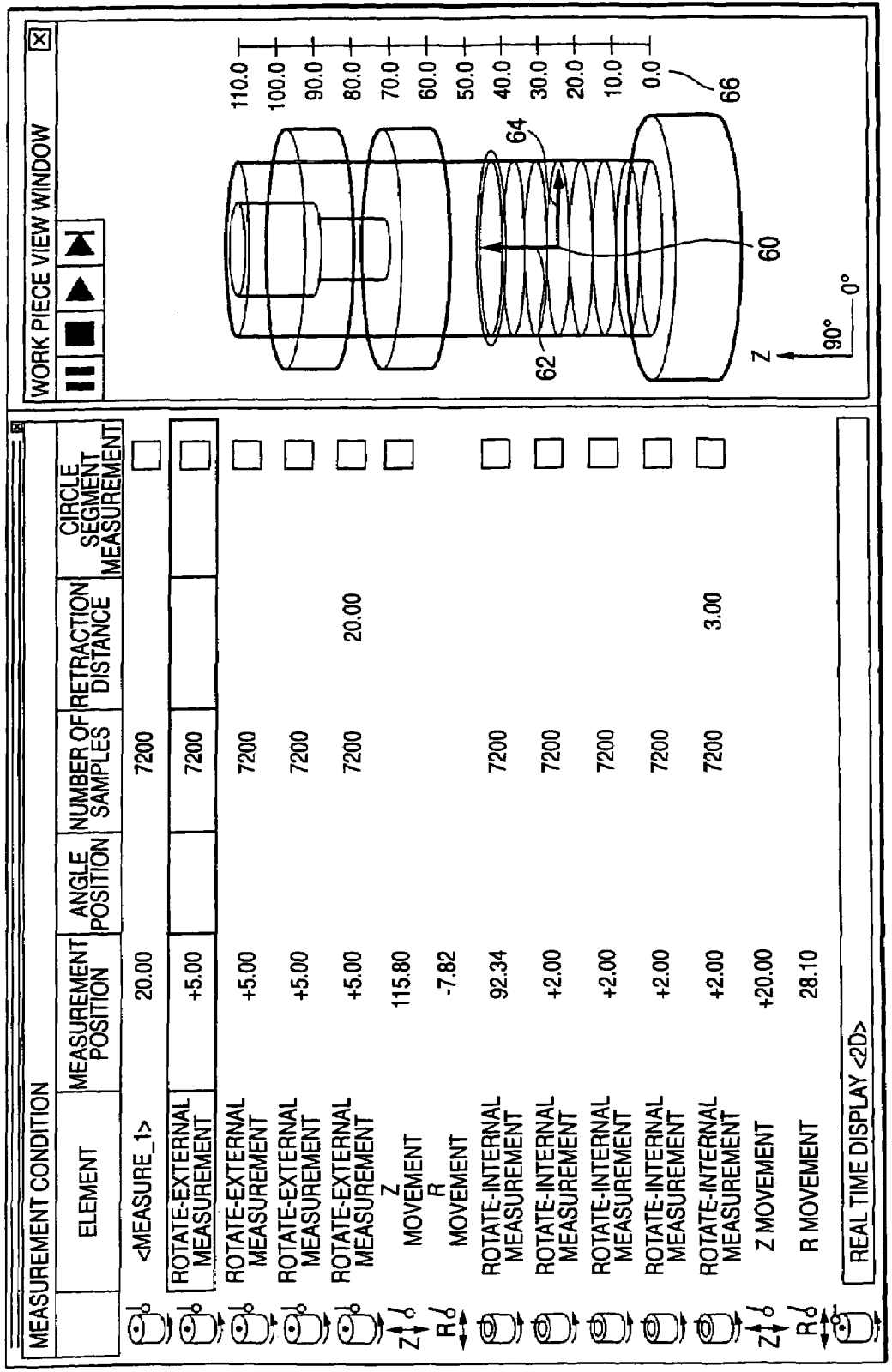
FIG. 6 is a diagram showing an example screen on which the measurement part program is displayed.

An example screen on which the measurement part program 40 is displayed is shown in FIG. 6.

Thereafter, when a measurement instruction or a moving instruction to be especially highlighted is included in the measurement part program 40, this instruction is selected by the measurement part program input section 16 (S70 or S80), and is highlighted by the display unit 22.

The measurement part program 40 and the selected instruction to be highlighted are analyzed by the analyzer 18, and the portion to be measured and the travel path are calculated (S90 and S100). At this time, a highlight mark is provided for the portion to be measured or for the travel path that corresponds to the selected instruction, and in the succeeding process (S150), the pertinent portion or the travel path is highlighted and displayed by the display unit 22.

Figure 7:
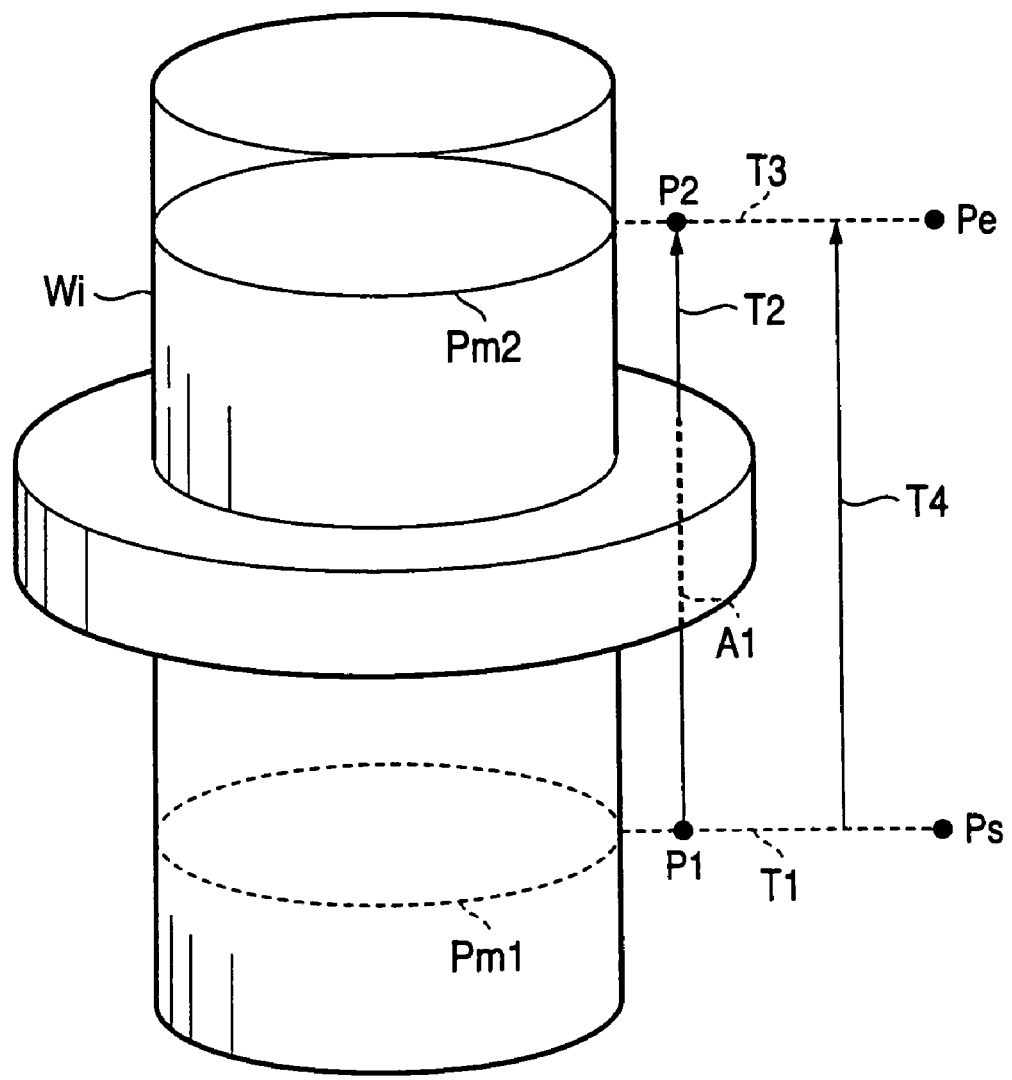
FIG. 7 is a diagram showing the results obtained by inspecting the measurement part program.

An example display is shown in FIG. 7, i.e., a contour shape image Wi of a workpiece, portions Pm1 and Pm2 that are to be measured and travel paths T1, T2 and T3 are displayed. In this example, a probe starts at a point Ps, through a point P1, to measure the portion Pm1, and returns thereafter to the point P1 and then moves to a point P2. After the portion Pm2 has been measured, the probe returns to the point P2. Then, the probe is positioned at a point Pe to terminate the measurement. The portion Pm2 and the travel path T2 (the path traveled from the point P1 to the point P2) are highlighted by a solid line.

Then, the analyzer 18 employs the analysis results obtained for the measurement part program 40 to generate coordinate axes (a Z axis 62 and an R axis 64) and a coordinate origin 60 (see FIG. 6) (S110). At this time, the analyzer 80 can also employ the contour shape generation results to generate coordinate axes (the Z axis 72 and the R axis 74) and the coordinate origin 70 (see FIG. 3)

Thereafter, based on the measurement part program analysis or the contour shape generation results, the analyzer 18 generates a coordinate scale 66 (see FIG. 6) (S120).

Next, the analyzer 18 checks an interference portion between the contour shape and the portion to be measured or the travel path (S130). During this check, the analyzer 18 checks whether the portions Pm1 and Pm2, which are to be measured, or the travel paths T1, T2 and T3 interfere with the substance portion Wi of the contour shape image of the workpiece. In the example in FIG. 7, the state wherein the travel path T2 interferes with the substance portion Wi in an area A1 is indicated by a thick broken line.

The corrector 24 removes the interference based on information for the interference area A1 (S140). In the example in FIG. 7, a travel path T4 is generated instead of the travel path T2.

Thereafter, the synthesizer 20 synthesizes the contour shape, the portions Pm1 and Pm2, which are to be measured, the travel paths T1 to T4, the coordinate axes 62 and 64 or 72 and 74, the coordinate origin 60 or 70, and the coordinate scale 66 and generates a display image. This image is displayed on the display unit 22 (S150).

The display image for the portion to be measured or the travel path can be manually corrected on the display unit 22 by manipulating an input device, such as a keyboard, a mouse, a cursor key or a light pen. When the display image is corrected (S160), the measurement part program 40 is corrected by the corrector 24 (S170). At this time, both the interference correction results (see S140) and the manual correction results are corrected.

Upon the reception of an instruction through an input device, such as a keyboard, the thus corrected measurement part program 50 is output by the corrected measurement part program output section 26.

The preferred embodiment of the invention has been explained; however, the present invention is not limited to this embodiment, and can be changed without departing from the subject of the invention.

In this embodiment, an explanation has been given mainly for a cylindrical workpiece that is measured using a true circle measuring instrument; however, the shape of the workpiece is not limited to that of a cylinder, and an arbitrary shape that can be defined is employed.

Further, the measurement part program may be executed by a surface property measuring instrument other than a true circle measuring instrument, such as a surface roughness measuring instrument, a contour shape measuring instrument or a three-dimensional measuring instrument.

In addition, for the contour shape of the workpiece, a cross-sectional view (FIG. 4) or a semi-see-through perspective view (FIG. 6) is displayed; however, a solid diagram may be employed that does not have a transparent portion.

The image, including the contour shape, may be provided from an arbitrary viewpoint, as a perspective view, for which an arbitrary viewing direction, is designated using a mouse or a keyboard, or the contour shape may be displayed inverted (e.g., as an upside-down display).

Furthermore, arbitrary colors, or a blinking display, may be employed to make it easy to identify the contour shape, the portions to be measured, the travel paths, the coordinate axes, the coordinate origin, the coordinate scale, the interference portion, and the highlighted portion to be measured and the highlighted travel paths. Items that are not required for the display may be omitted.

In addition, coordinate values may additionally be displayed for a selected measured portion or a travel path, or for designated points along the contour shape.

Moreover, selected portions of the display image may be arbitrarily enlarged or reduced.

Further, when the corrected measurement part program is output, arbitrary data entered using a keyboard (e.g., the name of an inspecting person, an inspection date, a correction date, the name of a workpiece, the model of the workpiece and the model of the measurement apparatus used) may be added to the corrected measurement part program.

As is described above, according to the present invention, it is possible to provide a measurement support method and apparatus wherein using shape definition data that are created based on brief shape data for a workpiece, a measurement part program can be inspected or corrected extremely easily.

What is claimed is:

1. A method for supporting a measurement of an object to be measured, the method comprises:
   entering shape definition data for an object to be measured;
   generating a contour shape based on the shape definition data;
   displaying the contour shape;
   entering a measurement part program;
   analyzing the measurement part program to automatically calculate a portion to be measured; and
   determining whether the measurement part program is adequate to measure the object without a collision or damage,
   wherein at the display step, the portion to be measured is displayed while superimposed on the contour shape.

2. A measurement support method according to claim 1, further comprising:
   analyzing the measurement part program to obtain a travel path,
   wherein at the display step, the travel path is displayed while superimposed on the contour shape.

3. A measurement support method according to claim 2, further comprising:
   checking an interference portion between the portion to be measured or the travel path, and the contour shape,
   wherein at the display step, the interference portion is displayed while superimposed on the contour shape.

4. A measurement support method according to claim 3, further comprising:
   correcting the portion to be measured or the travel path based on the interference portion to eliminate the interference portion; and
   correcting the measurement part program based on the elimination of the interference portion.

5. A measurement support method according to claim 2, further comprising:
   correcting the measurement part program based on results obtained by correcting the travel path that is displayed.

6. A measurement support method according to claim 2, further comprising:
   displaying the measurement part program and the contour shape at the same time; and
   selecting a movement instruction included in the measurement part program that is displayed,
   wherein at the step of calculating the travel path, a travel path corresponding to the selected movement instruction is highlighted and output.

7. A measurement support method according to claim 1, further comprising:
   correcting the measurement part program based on results obtained by correcting the portion to be measured which is displayed.

8. A measurement support method according to claim 1, further comprising:
   converting design data into shape definition data for the object to be measured.

9. A measurement support method according to claim 1, further comprising:
   generating at least one of coordinate axes and a coordinate origin by employing the measurement part program or the shape definition data,
   wherein at the display step, at the least one of the coordinate axes and the coordinate origin that is generated is displayed while superimposed on the contour shape.

10. A measurement support method according to claim 1, further comprising:
    generating coordinate scale based on the measurement part program or the shape definition data,
    wherein at the display step, the coordinate scale that is generated is displayed while superimposed on the contour shape.

11. A measurement support method according to claim 1, further comprising:
    displaying the measurement part program with the contour shape; and
    selecting a measurement instruction included in the measurement part program that is displayed,
    wherein at the step of calculating the portion to be measured, a portion corresponding to the selected measurement instruction is highlighted and output.

12. A measurement support method according to claim 1, wherein the shape definition data for the object to be measured includes at least one unit element of a zero-dimensional element, which is a point, a one-dimensional element, which is a line segment, or a two-dimensional element, which includes an arc.

13. A measurement support method according to claim 12, wherein the shape definition data of the object to be measured further includes an expansion element for the rotation of the unit element or for the parallel movement of the unit element.

14. An apparatus for supporting a measurement of an object to be measured, the apparatus comprising:
    a shape definition data input section for entering shape definition data for an object to be measured;
    a contour shape generator for generating a contour shape based on the shape definition data;
    a display unit for displaying the contour shape;
    a measurement part program input section for entering a measurement part program;
    an analyzer for analyzing the measurement part program, and automatically calculating and outputting analysis results, including a portion to be measured; and
    a determining unit for determining whether the measurement part program is adequate to measure the object without a collision or damage,
    wherein the display unit displays the portion to be measured superimposed on the contour shape.

15. A measurement support apparatus according to claim 14, further comprising:
    a corrector for correcting a synthesized image that is displayed; and
    a corrected measurement part program output section for correcting the measurement part program based on the corrected synthesized image and outputting the corrected measurement part program.

* * * * *